Sept. 25, 1923.   W. F. DUNBAR   1,468,628
HOE
Filed Feb. 1, 1922

Inventor
W.F. Dunbar.
By Herbert J. Jacobi
Attorney

Patented Sept. 25, 1923.

1,468,628

UNITED STATES PATENT OFFICE.

WILLIAM F. DUNBAR, OF COMSTOCK, NEBRASKA.

HOE.

Application filed February 1, 1922. Serial No. 533,407.

*To all whom it may concern:*

Be it known that WILLIAM F. DUNBAR, a citizen of the United States, residing at Comstock, in the county of Custer and State of Nebraska, has invented certain new and useful Improvements in Hoes, of which the following is a specification.

This invention relates to an agricultural implement, particularly to an instrument adapted for light work, such as work in a garden, hoeing weeds and other small work for which a larger implement or machine would not be suitable.

One of the objects of this invention is to provide a hoe having a blade slightly tapered outwardly so that drawing the instrument through the ground the dirt will pass over the blade leaving the ground clean and level.

A further object is to provide a hoe that will be relatively light in comparison to the common hoe or garden variety of hoe, and at the same time will be additionally strengthened where the tang connects with the hoe blade, thereby allowing more power to be applied when operating the same.

A still further object is to provide a hoe that can be easily and cheaply manufactured and one that can be placed on the market at a relatively low cost.

These and other objects will be better understood as the description proceeds.

Figure 1:
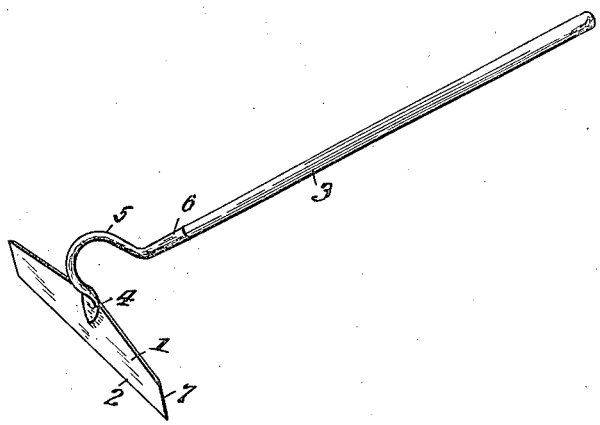
Figure 1 is a perspective view of my improved hoe.
Figure 2:
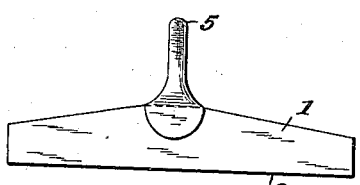
Figure 2 is a front elevation of the hoe blade.
Figure 3:
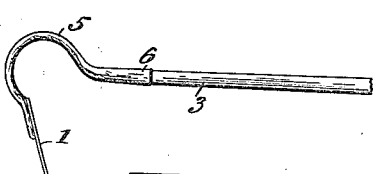
Figure 3 is a cross section on the line 3—3 of Fig. 1, through a section of the handle partly broken away.
Figure 4:
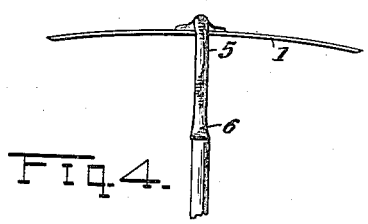
Figure 4 is a top plan view of my improved hoe with a section of the handle broken away.

Referring more particularly to the drawings in detail, like numbers will be used to designate like parts throughout the same. The numeral 1 indicates a hoe blade provided with the usual scrape cutting edge 2 and connected with a tang 3 at approximately the upper edge of same and centrally of the blade. The tang 3 extends into a neck, 4 and terminates to a shank 5 adapted to receive a handle 6. The upper edge of the blade being slightly tapered from where the tang engages the blade so that in drawing the hoe through the ground dirt will pass over same, thereby avoiding clogging of the dirt in the front of the hoe which permits the hoe to be drawn with very little effort on the part of one operating same. The edges of the ends of the blade are sharpened as at 7 so that the ends of same can be used in cutting weeds and other purposes where there is not sufficient space to permit the use of the hoe in the proper manner.

While I have shown and described the preferred form of my invention, I realize that minor details may be resorted to without departing from the spirit and the scope of the invention, therefore, I do not wish to limit myself as to the details of construction shown.

What I claim as new is:—

1. In a hoe, a blade relatively low throughout its width, a handle, and a shank joining said blade and handle, said shank having the form of an upwardly bowed loop, a portion of which extends forwardly of the blade.

2. In a hoe, a blade relatively low throughout its width, a handle, and a shank joining the blade and handle, said shank having the form of a loop with a relatively wide mouth and a portion thereof extending forwardly of the blade from the upper edge thereof.

3. In a hoe, a blade of relatively low height at its central portion and of diminishing height toward its ends, a handle, and a shank joining the blade and handle having the form of a relatively high loop with a wide mouth and with a portion thereof extending forwardly of the blade at its upper edge.

In testimony whereof I affix my signature.

WILLIAM F. DUNBAR.